(12) United States Patent
Cui et al.

(10) Patent No.: US 10,397,893 B2
(45) Date of Patent: Aug. 27, 2019

(54) MOBILE TERMINAL POSITIONING METHOD, BASE STATION, AND NODE

(71) Applicant: Huawei Technologies Co., Ltd., Shenzhen (CN)

(72) Inventors: Jie Cui, Shenzhen (CN); Anjian Li, Beijing (CN); Xizeng Dai, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 183 days.

(21) Appl. No.: 15/459,254

(22) Filed: Mar. 15, 2017

(65) Prior Publication Data

US 2017/0188328 A1 Jun. 29, 2017

Related U.S. Application Data

(63) Continuation of application No. PCT/CN2014/086629, filed on Sep. 16, 2014.

(51) Int. Cl.
*H04W 64/00* (2009.01)
*H04B 17/318* (2015.01)
*H04B 17/336* (2015.01)
*H04L 5/00* (2006.01)
*H04W 24/10* (2009.01)
*H04W 52/16* (2009.01)
*H04W 52/32* (2009.01)
(Continued)

(52) U.S. Cl.
CPC .......... *H04W 64/00* (2013.01); *H04B 17/318* (2015.01); *H04B 17/336* (2015.01); *H04L 5/0048* (2013.01); *H04W 24/10* (2013.01); *H04W 52/16* (2013.01); *H04W 52/325* (2013.01); *H04W 56/0015* (2013.01); *H04W 72/1231* (2013.01); *H04W 72/1268* (2013.01)

(58) Field of Classification Search
None
See application file for complete search history.

(56) References Cited

U.S. PATENT DOCUMENTS

| 2005/0130669 A1* | 6/2005 | Mizugaki | H04W 64/00 |
| | | | 455/456.1 |
| 2010/0103867 A1 | 4/2010 | Kishiyama et al. | |
| 2011/0117926 A1 | 5/2011 | Hwang et al. | |

(Continued)

FOREIGN PATENT DOCUMENTS

| CN | 1722897 A | 1/2006 |
| CN | 101472333 A | 7/2009 |

(Continued)

*Primary Examiner* — Jamaal Henson
(74) *Attorney, Agent, or Firm* — Slater Matsil, LLP

(57) ABSTRACT

A method is provided. The method includes allocating a specified time period for receiving an uplink reference signal to each node, receiving an uplink reference signal that is received in the specified time period and forwarded by each node, obtaining power or a signal-to-noise ratio of the uplink reference signal forwarded by each node, selecting a time period corresponding to an uplink reference signal with maximum power or a maximum signal-to-noise ratio as a positioning time period, obtaining a corresponding positioning node according to the positioning time period and the specified time period for receiving an uplink reference signal, and determining a location of the mobile terminal according to a location of the positioning node.

22 Claims, 10 Drawing Sheets

(51) Int. Cl.
*H04W 56/00* (2009.01)
*H04W 72/12* (2009.01)

(56) References Cited

U.S. PATENT DOCUMENTS

| | | | |
|---|---|---|---|
| 2011/0176499 A1* | 7/2011 | Siomina | G01S 1/042 |
| | | | 370/329 |
| 2011/0207477 A1* | 8/2011 | Siomina | G01S 5/0278 |
| | | | 455/456.2 |
| 2012/0040687 A1* | 2/2012 | Siomina | G01S 5/0205 |
| | | | 455/456.1 |
| 2012/0231803 A1* | 9/2012 | Soliman | G01S 1/042 |
| | | | 455/450 |
| 2012/0252487 A1* | 10/2012 | Siomina | H04W 24/10 |
| | | | 455/456.1 |
| 2012/0314604 A1 | 12/2012 | Siomina et al. | |
| 2013/0051317 A1* | 2/2013 | Ji | H04W 24/02 |
| | | | 370/328 |
| 2014/0171111 A1* | 6/2014 | Xiao | H04W 64/00 |
| | | | 455/456.1 |
| 2015/0011236 A1* | 1/2015 | Kazmi | H04B 17/27 |
| | | | 455/456.1 |
| 2015/0087338 A1* | 3/2015 | Kazmi | H04W 64/00 |
| | | | 455/456.1 |
| 2015/0133173 A1* | 5/2015 | Edge | G01S 1/66 |
| | | | 455/456.6 |

FOREIGN PATENT DOCUMENTS

| | | |
|---|---|---|
| CN | 101584132 A | 11/2009 |
| CN | 102265687 A | 11/2011 |
| CN | 102573059 A | 7/2012 |
| CN | 102711040 A | 10/2012 |
| CN | 102823308 A | 12/2012 |
| EP | 2120370 A1 | 11/2009 |
| GB | 2494134 A | 3/2013 |

* cited by examiner

MOBILE TERMINAL POSITIONING METHOD, BASE STATION, AND NODE

CROSS-REFERENCE TO RELATED APPLICATIONS

This application is a continuation of International Application No. PCT/CN2014/086629, filed on Sep. 16, 2014, the disclosure of which is hereby incorporated by reference in its entirety.

TECHNICAL FIELD

The present invention relates to the communications field, and in particular, to a mobile terminal positioning method, a base station, and a node.

BACKGROUND

In recent years, a quantity of global mobile terminal users grows rapidly, and a requirement for positioning a mobile terminal is ever increasing. Application scenarios of mobile terminal positioning services tend to be diversified, such as logistics management, emergency rescue, monitoring, and crime tracking.

Currently, a positioning manner frequently used in a mobile system is CID (Cell Identification) positioning that is also referred to as COO (Cell of Origin) positioning or CGI (Cell Global Identity) positioning. In a main technical solution, a geographical location of a mobile terminal is represented according to a base station to which a current cell of the mobile terminal belongs. According to a cell ID, a base station that represents the mobile terminal and geographical information of the base station can be learned, so that a location of the mobile terminal can be learned.

To improve positioning accuracy, some auxiliary transmission nodes may be deployed by using a coverage and capacity enhancement technology in a wireless network. These nodes are used to represent a location of a mobile terminal, so that the positioning accuracy can be improved. However, if nodes included in a positioning area share a same cell ID, a base station cannot determine, according to the cell ID, a node that forwards a positioning signal received from a mobile terminal, that is, when cell IDs are the same, the base station cannot determine, according to the cell IDs, a coverage area of a node to which the mobile terminal belongs, and cannot position the mobile terminal. Currently, there is no corresponding method for resolving a mobile terminal positioning problem when cell IDs of nodes are the same.

SUMMARY

In view of this, embodiments of the present invention provide a mobile terminal positioning method, to resolve a mobile terminal positioning problem that exists when cell IDs of nodes are the same.

To resolve the foregoing technical problem, the embodiments of the present invention disclose the following technical solutions:

According to a first aspect, a mobile terminal positioning method is provided. The method includes allocating a specified time period for receiving an uplink reference signal to each node. The method also includes receiving an uplink reference signal that is received in the specified time period and forwarded by each node. The method also includes obtaining power or a signal-to-noise ratio of the uplink reference signal forwarded by each node. The method also includes selecting a time period corresponding to an uplink reference signal with maximum power or a maximum signal-to-noise ratio as a positioning time period. The method also includes obtaining a corresponding positioning node according to the positioning time period and the specified time period for receiving an uplink reference signal. The method also includes determining a location of the mobile terminal according to a location of the positioning node.

With reference to the first aspect, in a first possible implementation manner of the first aspect, after the allocating a specified time period for receiving an uplink reference signal to each node, the method further includes sending the specified time period for receiving an uplink reference signal to each node.

With reference to the first aspect, in a second possible implementation manner of the first aspect, before the receiving an uplink reference signal that is received in the specified time period and forwarded by each node, the method further includes sending a synchronization command to each node, so that each node synchronizes with the base station in terms of time.

With reference to the first aspect, in a third possible implementation manner of the first aspect, before the receiving an uplink reference signal that is received in the specified time period and forwarded by each node, the method further includes sending an uplink signal configuration command to the mobile terminal, so that the mobile terminal sends the uplink reference signal to each node according to the uplink signal configuration command.

With reference to any one of the first aspect, or the first possible implementation manner of the first aspect to the third possible implementation manner of the first aspect, before the receiving an uplink reference signal that is received in the specified time period and forwarded by each node, the method further includes sending a power control rule to the mobile terminal, so that the mobile terminal sends uplink reference signals at consistent power.

With reference to any one of the first aspect, or the first possible implementation manner of the first aspect to the third possible implementation manner of the first aspect, before the selecting a time period corresponding to an uplink reference signal with maximum power or a maximum signal-to-noise ratio as a positioning time period, the method further includes modifying the power of the obtained uplink reference signal according to a power variation of the uplink reference signal sent by the mobile terminal.

According to a second aspect, a mobile terminal positioning method is provided and is used by a node. The method includes receiving a specified time period allocated by a base station for receiving an uplink reference signal. The method also includes receiving, according to the specified time period for receiving an uplink reference signal, an uplink reference signal sent by a mobile terminal. The method also includes forwarding the uplink reference signal to the base station, so that the base station obtains power of the uplink reference signal or a signal-to-noise ratio of the uplink reference signal, selects a time period corresponding to an uplink reference signal with maximum power or a maximum signal-to-noise ratio as a positioning time period, obtains a corresponding positioning node according to the positioning time period and the specified time period for receiving an uplink reference signal, and determines a location of the mobile terminal according to a location of the positioning node.

With reference to the second aspect, in a first possible implementation manner of the second aspect, before the receiving, according to the specified time period, an uplink reference signal sent by a mobile terminal, the method further includes receiving a synchronization command sent by the base station, and synchronizing with the base station in terms of time according to the synchronization command.

According to a third aspect, a mobile terminal positioning method is provided and is used by a base station. The method includes allocating, to each node, a specified time period for sending a channel quality indicator request. The method also includes receiving a channel quality indicator sent by the mobile terminal, where the channel quality indicator is a detection result that is of quality of a channel between each node and the mobile terminal and that is detected by the mobile terminal according to a channel quality indicator request sent by each node in the specified time period. The method also includes obtaining a time period corresponding to a channel quality indicator with a maximum value, and using the time period as a positioning time period. The method also includes obtaining a corresponding positioning node according to the positioning time period and the specified time period for sending a signal quality indicator. The method also includes determining a location of the mobile terminal according to a location of the positioning node.

With reference to the third aspect, in a first possible implementation manner of the third aspect, after the allocating, to each node, a specified time period for sending a channel quality indicator request, the method further includes sending, to each node, the specified time period for sending a channel quality indicator.

With reference to the third aspect, in a second possible implementation manner of the third aspect, before the receiving a channel quality indicator sent by the mobile terminal, the method further includes sending a synchronization command to each node, so that each node synchronizes with the base station in terms of time.

According to a fourth aspect, a mobile terminal positioning method is provided and is used by a node. The method includes receiving a specified time period allocated by a base station for sending a channel quality indicator request. The method includes sending a channel quality indicator request to the mobile terminal according to the specified time period for sending a channel quality indicator request, so that the base station receives a channel quality indicator sent by the mobile terminal, obtains a time period corresponding to a channel quality indicator with a maximum value, uses the time period as a positioning time period, obtains a corresponding positioning node according to the positioning time period and the specified time period for sending a channel quality indicator request, and determines a location of the mobile terminal according to a location of the positioning node. The channel quality indicator is a detection result that is of quality of a channel between each node and the mobile terminal and that is detected by the terminal according to the channel quality indicator request.

With reference to a fourth aspect, in a first possible implementation manner of the fourth aspect, before the sending a channel quality indicator request to the mobile terminal according to the specified time period for sending a channel quality indicator request, the method further includes receiving a synchronization command sent by the base station, and synchronizing with the base station in terms of time according to the synchronization command.

According to a fifth aspect, a mobile terminal positioning method is provided and is used by a base station. The method includes sending a channel quality indicator request to a specified node, so that the specified node forwards the channel quality indicator request to the mobile terminal. The method also includes receiving a channel quality indicator sent by the mobile terminal, where the channel quality indicator is a detection result that is of quality of a channel between the specified node and the mobile terminal and that is detected by the mobile terminal according to the channel quality indicator request forwarded by the specified node. The method also includes obtaining a specified node corresponding to a channel quality indicator with a maximum value, and using the specified node as a positioning node. The method also includes determining a location of the mobile terminal according to a location of the positioning node.

According to a sixth aspect, a mobile terminal positioning method is provided and is used by a node. The method includes receiving a channel quality indicator sent by a base station, and forwarding the channel quality indicator to the mobile terminal, so that the mobile terminal detects a detection result of quality of a channel between the specified node and the mobile terminal according to the channel quality indicator request, and sends the detection result to the base station as the channel quality indicator, and the base station obtains a node corresponding to a channel quality indicator with a maximum value, uses the node as a positioning node, and determines a location of the mobile terminal according to a location of the positioning node.

According to a seventh aspect, a base station is provided. The base station includes a first allocation unit, configured to allocate a specified time period for receiving an uplink reference signal to each node. The base station also includes a first receiving unit, configured to receive an uplink reference signal that is received in the specified time period and forwarded by each node. The base station also includes a first obtaining unit, configured to obtain power or a signal-to-noise ratio of the uplink reference signal forwarded by each node. The base station also includes a first comparison unit, configured to select a time period corresponding to an uplink reference signal with maximum power or a maximum signal-to-noise ratio as a positioning time period. The base station also includes a first positioning node obtaining unit, configured to obtain a corresponding positioning node according to the positioning time period and the specified time period for receiving an uplink reference signal. The base station also includes a first positioning unit, configured to determine a location of the mobile terminal according to a location of the positioning node.

With reference to the seventh aspect, in a first possible implementation manner of the seventh aspect, the base station further includes a first sending unit, configured to send the specified time period for receiving an uplink reference signal to each node.

With reference to the seventh aspect, in a second possible implementation manner of the seventh aspect, the base station further includes a first synchronization command sending unit, configured to send a synchronization command to each node, so that each node synchronizes with the base station in terms of time.

With reference to the seventh aspect, in a third possible implementation manner of the seventh aspect, the base station further includes a configuration command sending unit, configured to send an uplink signal configuration command to the mobile terminal, so that the mobile terminal sends the uplink reference signal to the node according to the uplink signal configuration command.

With reference to any one of the seventh aspect, or the first possible implementation manner of the seventh aspect to the third possible implementation manner of the seventh aspect, the base station further includes a power control rule sending unit, configured to send a power control rule to the mobile terminal, so that the mobile terminal sends uplink reference signals at consistent power.

With reference to any one of the seventh aspect, or the first possible implementation manner of the seventh aspect to the third possible implementation manner of the seventh aspect, the base station further includes: a modification unit, configured to modify, before the first obtaining unit selects the time period corresponding to the uplink reference signal with the maximum power or the maximum signal-to-noise ratio as the positioning time period, the power of the obtained uplink reference signal according to a power variation of the uplink reference signal sent by the mobile terminal.

According to an eighth aspect, a node is further provided. The node includes a second receiving unit, configured to receive a specified time period allocated by a base station for receiving an uplink reference signal. The node also includes a second sending unit, configured to receive, according to the specified time period, an uplink reference signal sent by a mobile terminal. The node also includes a forwarding unit, configured to forward the uplink reference signal to the base station, so that the base station obtains power of the uplink reference signal or a signal-to-noise ratio of the uplink reference signal, selects a time period corresponding to an uplink reference signal with maximum power or a maximum signal-to-noise ratio as a positioning time period, obtains a corresponding positioning node according to the positioning time period and the specified time period for receiving an uplink reference signal, and determines a location of the mobile terminal according to a location of the positioning node.

With reference to the eighth aspect, in a first possible implementation manner of the eighth aspect, the node further includes a first synchronization unit, configured to: receive a synchronization command sent by the base station, and synchronize with the base station in terms of time according to the synchronization command.

According to a ninth aspect, a base station is provided. The base station includes: a second allocation unit, configured to allocate, to each node, a specified time period for sending a channel quality indicator request. The base station also includes a third receiving unit, configured to receive a channel quality indicator sent by the mobile terminal, where the channel quality indicator is a detection result that is of quality of a channel between each node and the mobile terminal and that is detected by the mobile terminal according to a channel quality indicator request sent by each node in the specified time period. The base station also includes a second comparison unit, configured to: obtain a time period corresponding to a channel quality indicator with a maximum value, and use the time period as a positioning time period. The base station also includes a second positioning node obtaining unit, configured to obtain a corresponding positioning node according to the positioning time period and the specified time period for sending a signal quality indicator. The base station also includes a second positioning unit, configured to determine a location of the mobile terminal according to a location of the positioning node.

With reference to the ninth aspect, in a first possible implementation manner of the ninth aspect, the base station further includes: a third sending unit, configured to send, to each node, the specified time period for sending a channel quality indicator.

With reference to the ninth aspect, in a second possible implementation manner of the ninth aspect, the base station further includes: a second synchronization command sending unit, configured to send a synchronization command to each node, so that each node synchronizes with the base station in terms of time.

According to a tenth aspect, a node is provided. The node includes a fourth receiving unit, configured to receive a specified time period allocated by a base station for sending a channel quality indicator request. The node also includes a channel quality request sending unit, configured to send a channel quality indicator request to the mobile terminal according to the specified time period, so that the base station receives a channel quality indicator sent by the mobile terminal, obtains a time period corresponding to a channel quality indicator with a maximum value, uses the time period as a positioning time period, obtains a corresponding positioning node according to the positioning time period and the specified time period for sending a channel quality indicator request, and determines a location of the mobile terminal according to a location of the positioning node. The channel quality indicator is a detection result that is of quality of a channel between each node and the mobile terminal and that is detected by the terminal according to the channel quality indicator request.

With reference to the tenth aspect, in a first possible implementation manner of the tenth aspect, the node further includes: a second synchronization unit, configured to: receive a synchronization command sent by the base station, and synchronize with the base station in terms of time according to the synchronization command.

According to an eleventh aspect, a base station is provided. The base station includes: a fourth sending unit, configured to send a channel quality indicator request to a specified node, so that the specified node forwards the channel quality indicator request to the mobile terminal. The base station also includes a channel quality indicator receiving unit, configured to receive a channel quality indicator sent by the mobile terminal, where the channel quality indicator is a detection result that is of quality of a channel between the specified node and the mobile terminal and that is detected by the mobile terminal according to the channel quality indicator request forwarded by the specified node. The base station also includes a third positioning node obtaining unit, configured to: obtain a specified node corresponding to a channel quality indicator with a maximum value, and use the specified node as a positioning node. The base station also includes a third positioning unit, configured to determine a location of the mobile terminal according to a location of the positioning node.

According to a twelfth aspect, a node is provided. The node includes a receiving and forwarding unit, configured to: receive a channel quality indicator sent by a base station, and forward the channel quality indicator to the mobile terminal, so that the mobile terminal detects a detection result of quality of a channel between the specified node and the mobile terminal according to the channel quality indicator request, and sends the detection result to the base station as the channel quality indicator, and the base station obtains a node corresponding to a channel quality indicator with a maximum value, uses the node as a positioning node, and determines a location of the mobile terminal according to a location of the positioning node.

The embodiments of the present invention provide a mobile terminal positioning method. A specified time period for receiving an uplink reference signal is allocated to each node, and an uplink reference signal that is received in the specified time period and forwarded by each node is received, so that a node that receives each uplink reference signal may be learned. Maximum power of the uplink reference signal or a maximum signal-to-noise ratio of the uplink reference signal is obtained, and a node that is closest to a mobile terminal is obtained, so that a location of the mobile terminal is obtained. Therefore, a problem that the mobile terminal cannot be positioned when cell IDs of nodes are the same is resolved and accuracy of positioning the mobile terminal is improved.

It should be understood that the foregoing general description and the following detailed description are merely examples, and cannot limit the protection scope of the present invention.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

Specific embodiments of the present invention have been shown by using the foregoing accompanying drawings, and more detailed descriptions are provided in the following. These accompanying drawings and descriptions are not intended to limit the inventive scope of the present invention in any manner, but are intended to describe the concept of the present invention for a person skilled in the art with reference to specific embodiments.

DETAILED DESCRIPTION OF ILLUSTRATIVE EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

For complete understanding of the present invention, many specific details are mentioned in the following detailed description. However, a person skilled in the art should understand that the present invention may be implemented without these specific details. In other embodiments, a well-known method, process, component, and circuit are not described in detail, so that the embodiment is described without being unnecessarily blurred.

Embodiment 1

Figure 1:
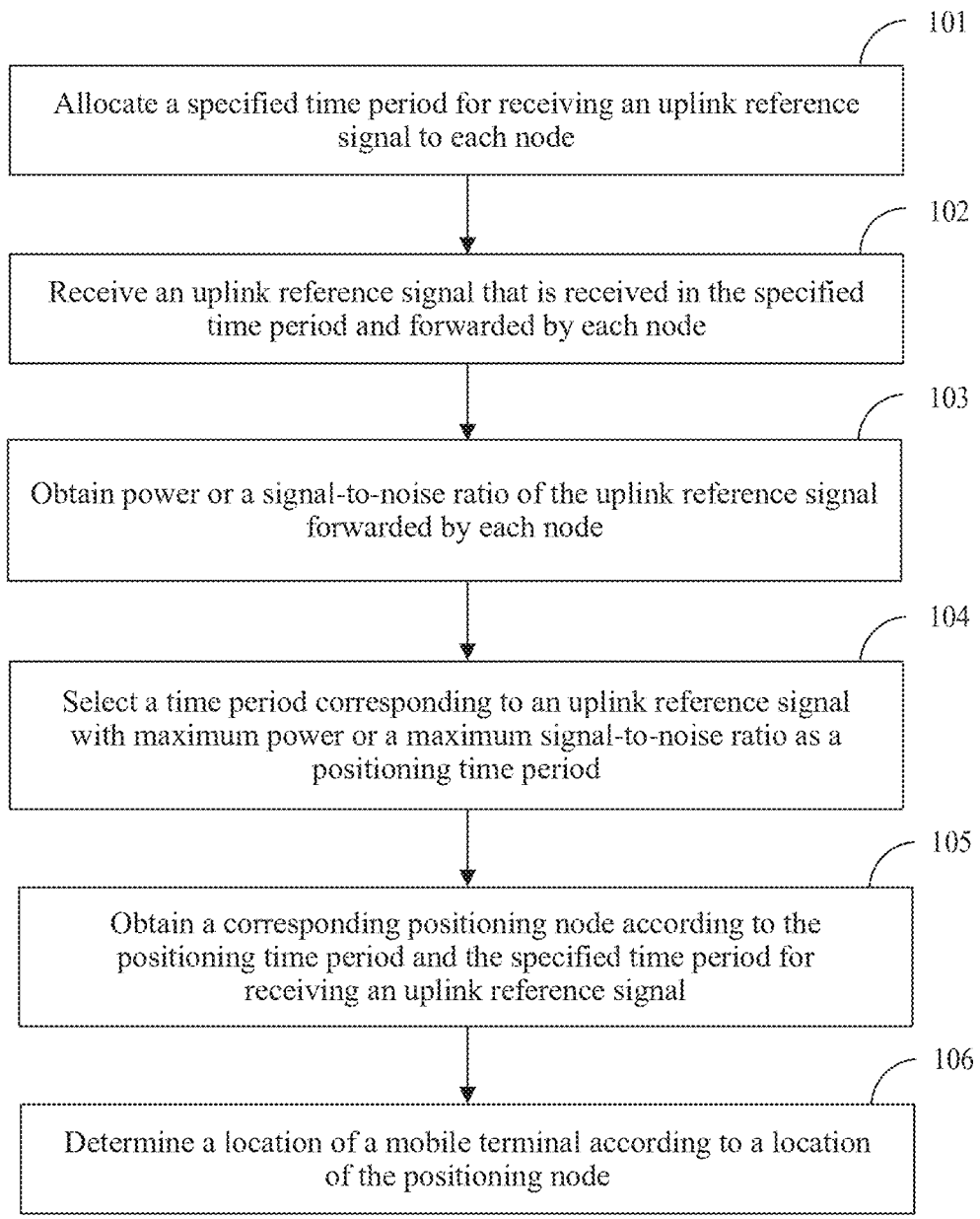
FIG. 1 is a flowchart of a mobile terminal positioning method according to an embodiment of the present invention.

FIG. 1 is a flowchart of a mobile terminal positioning method according to an embodiment of the present invention, and the method is used by a base station. In this embodiment, a mobile terminal is positioned by using uplink data. As shown in FIG. 1, the method includes the following steps.

Step 101: Allocate a specified time period for receiving an uplink reference signal to each node.

Step 102: Receive an uplink reference signal that is received in the specified time period and forwarded by each node.

In this embodiment of the present invention, after receiving an uplink reference signal, a node may forward the uplink reference signal in a received time period, or may delay forwarding. For example, the node receives the uplink reference signal in an $N^{th}$ time period, and forwards the uplink reference signal to the base station in the $N^{th}$ time period, or may delay forwarding the uplink reference signal to the base station in an $(N+5)^{th}$ time period.

Each node delays forwarding the uplink reference signal for a same delay time. Therefore, the base station may still learn, according to an uplink reference signal receiving rule, a node from which a received uplink reference signal comes.

Step 103: Obtain power or a signal-to-noise ratio of the uplink reference signal forwarded by each node.

The signal-to-noise ratio of the uplink reference signal is a ratio of the power of the uplink reference signal to channel noise of the uplink reference signal, and the channel noise is a constant. Therefore, there is only a difference of only one multiple between the power of the uplink reference signal and the signal-to-noise ratio of the uplink reference signal, and the power of the uplink reference signal and the signal-to-noise ratio of the uplink reference signal may indicate a same feature. In this embodiment of the present invention, obtaining the power of the uplink reference signal may be equal to obtaining the signal-to-noise ratio of the uplink reference signal.

Step 104: Select a time period corresponding to an uplink reference signal with maximum power or a maximum signal-to-noise ratio as a positioning time period.

Step 105: Obtain a corresponding positioning node according to the positioning time period and the specified time period for receiving an uplink reference signal.

Step 106: Determine a location of the mobile terminal according to a location of the positioning node.

The power of the uplink reference signal is attenuated with distance. After receiving the uplink reference signal, the node forwards the uplink reference signal according to the power of the received uplink reference signal. The base station may learn, according to the power of the received uplink reference signal or the signal-to-noise ratio of the received uplink reference signal, a node that is closest to the mobile terminal.

In this embodiment, the determining a location of the mobile terminal according to a location of the positioning node includes: using the location of the positioning node as the location of the mobile terminal.

In this embodiment, this embodiment of the present invention provides a mobile terminal positioning method. A specified time period for receiving an uplink reference signal is allocated to each node, and an uplink reference signal that is received in the specified time period and forwarded by each node is received, so that a node that receives each uplink reference signal may be learned. Maximum power of the uplink reference signal or a maximum signal-to-noise ratio of the uplink reference signal is obtained, and a node that is closest to a mobile terminal is obtained, so that a location of the mobile terminal is obtained. Therefore, a problem that the mobile terminal cannot be positioned when cell IDs of nodes are the same is resolved and accuracy of positioning the mobile terminal is improved.

Before step 101, the method further includes: sending the specified time period for receiving an uplink reference signal to each node.

In this embodiment of the present invention, in each time period, there is only one node that receives an uplink reference signal, and uplink data receiving of another node is disabled. In another embodiment of the present invention, if the base station may determine that the mobile terminal is in a coverage area of only one node, there may be more than one node in each time period that receives an uplink reference signal. In this way, even if there is more than one node in a same time period that receives an uplink reference signal, because the mobile terminal is in the coverage area of only one node, there is only one node that can receive and forward an uplink reference signal sent by the mobile terminal, and the base station may determine a node from which the uplink reference signal comes.

Because there is more than one node in a same time period that can receive an uplink reference signal, a network throughput can be saved.

Before step 101, the method further includes: sending a synchronization command to each node, so that each node synchronizes with the base station in terms of time.

Before step 101, the method further includes: sending an uplink signal configuration command to the mobile terminal, so that the mobile terminal broadcasts the uplink reference signal to each node according to the uplink signal configuration command.

In an ideal situation, power of uplink reference signals sent by the mobile terminal is the same. However, in practice, the power of the uplink reference signal sent by the mobile terminal may be different in different time periods. For inconsistency of the power of the uplink reference signals sent by the mobile terminal in practice, in this embodiment of the present invention, before step 102, the method further includes:

modifying the power of the obtained uplink reference signal according to a power variation of the uplink reference signal sent by the mobile terminal.

The power of the uplink reference signals sent by the mobile terminal is different, but the base station may learn the power variation of the mobile terminal. After receiving the uplink reference signal, the base station modifies the power of the obtained uplink reference signal according to a power variation rule. The power of the received uplink reference signal is modified, so that an error can be reduced. For example, transmit power of the mobile terminal is 10 dB in an $N^{th}$ time period and an $(N+10)^{th}$ time period, and transmit power of the mobile terminal is 12 dB after the $(N+10)^{th}$ time period. After the base station receives an uplink reference signal sent after the $(N+10)^{th}$ time period, 2 dB is subtracted, to reduce an error caused when transmit power of the mobile terminal is inconsistent.

Inconsistency of the transmit power of the mobile terminal in a period of time may be adjusted by the base station. For example, because the transmit power of the mobile terminal is extremely small and a signal received by the base station is relatively weak, the base station commands the mobile terminal to increase the transmit power and the mobile terminal increases the transmit power.

For inconsistency of the power of the uplink reference signals sent by the mobile terminal in practice, in another embodiment of the present invention, before step 101, the method further includes: sending a power control rule to the mobile terminal, so that the mobile terminal sends uplink reference signals at consistent power.

The base station sends the power control rule to the mobile terminal, so that the mobile terminal sends the uplink reference signals at consistent power and an error can be reduced.

Embodiment 2

Figure 2:
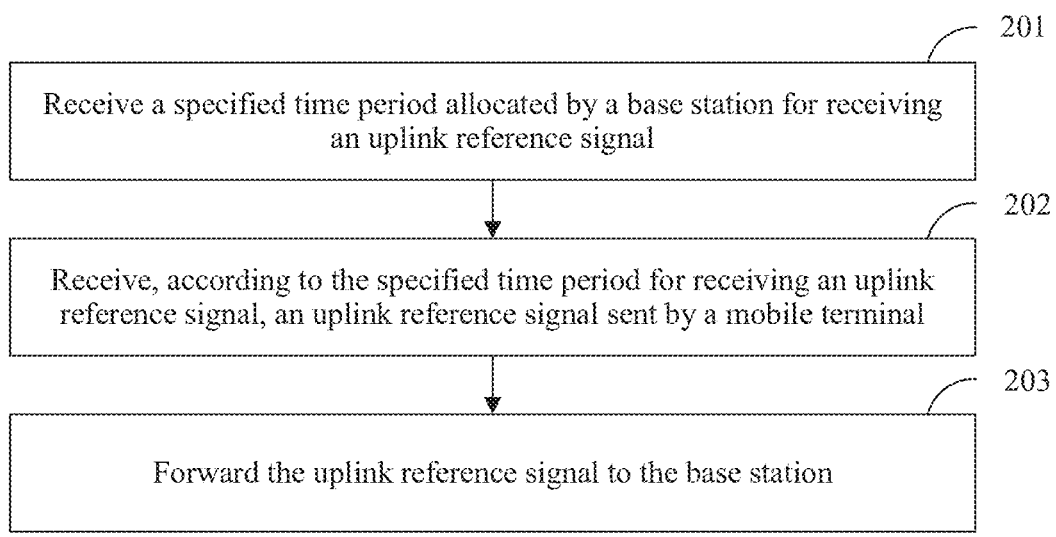
FIG. 2 is a flowchart of a mobile terminal positioning method according to an embodiment of the present invention.

FIG. 2 is a flowchart of a mobile terminal positioning method according to an embodiment of the present invention, and the method is used by a node. As shown in FIG. 2, the method includes the following steps.

Step 201: Receive a specified time period allocated by a base station for receiving an uplink reference signal.

Step 202: Receive, according to the specified time period for receiving an uplink reference signal, an uplink reference signal sent by a mobile terminal.

Step 203: Forward the uplink reference signal to the base station, so that the base station obtains power of the uplink reference signal or a signal-to-noise ratio of the uplink reference signal, selects a time period corresponding to an uplink reference signal with maximum power or a maximum signal-to-noise ratio as a positioning time period, obtains a corresponding positioning node according to the positioning time period and the specified time period for receiving an uplink reference signal, and determines a location of the mobile terminal according to a location of the positioning node.

The power of the uplink reference signal forwarded by the node is equal to power of the uplink reference signal received by the node.

Before step 201, the method further includes: receiving a synchronization command sent by the base station, and synchronizing with the base station in terms of time according to the synchronization command.

A node receives an uplink reference signal in a specified time period for receiving an uplink reference signal, and sends the uplink reference signal to a base station, so that the base station determines, according to a time period in which the uplink reference signal is received, a node that receives the uplink reference signal. Therefore, problems that when cell IDs of nodes are the same, a node from which a received uplink reference signal comes cannot be identified and a mobile terminal cannot be positioned are resolved, and accuracy of positioning the mobile terminal is improved.

Embodiment 3

Figure 3:
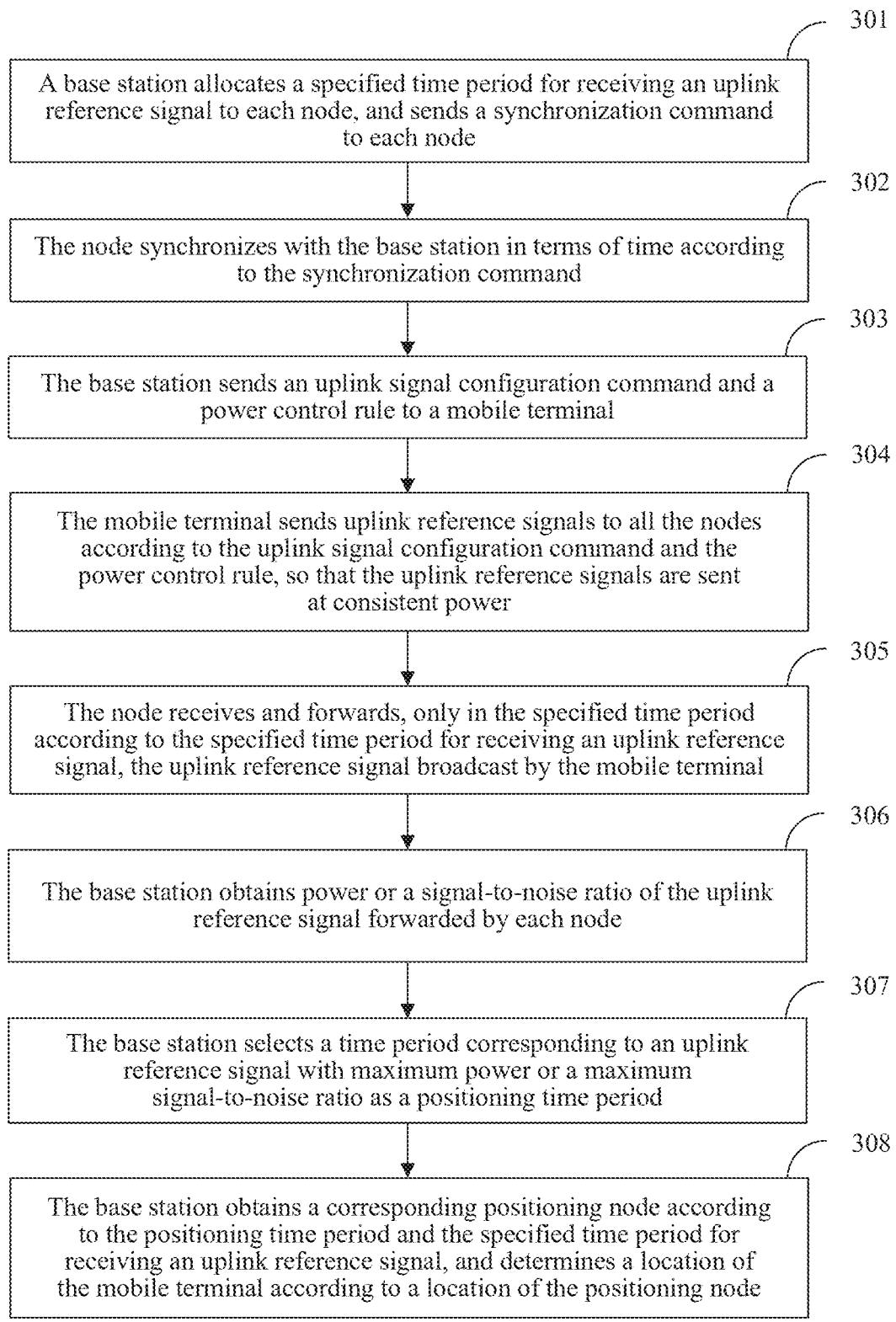
FIG. 3 is a flowchart of a mobile terminal positioning method according to an embodiment of the present invention.

FIG. 3 is a flowchart of a mobile terminal positioning method according to an embodiment of the present invention. The method includes the following steps.

Step 301: A base station allocates a specified time period for receiving an uplink reference signal to each node, and sends a synchronization command to each node.

Step 302: The node synchronizes with the base station in terms of time according to the synchronization command.

Step 303: The base station sends an uplink signal configuration command and a power control rule to a mobile terminal.

Step 304: The mobile terminal sends uplink reference signals to all the nodes according to the uplink signal configuration command and the power control rule, so that the uplink reference signals are sent at consistent power.

Step 305: The node receives and forwards, only in the specified time period according to the specified time period for receiving an uplink reference signal, the uplink reference signal broadcast by the mobile terminal.

Step 306: The base station obtains power or a signal-to-noise ratio of the uplink reference signal forwarded by each node.

Step 307: The base station selects a time period corresponding to an uplink reference signal with maximum power or a maximum signal-to-noise ratio as a positioning time period.

Step 308: The base station obtains a corresponding positioning node according to the positioning time period and the specified time period for receiving an uplink reference signal, and determines a location of the mobile terminal according to a location of the positioning node.

In this embodiment, a specified time period for receiving an uplink reference signal is allocated to each node, and a node from which each uplink reference signal comes may be learned according to a time period in which an uplink reference signal is received. Maximum power is obtained, and a node that is closest to a mobile terminal is obtained, so that a location of the mobile terminal is obtained. Therefore, problems that when cell IDs of nodes are the same, a node from which a received uplink reference signal comes cannot be identified and the mobile terminal cannot be positioned are resolved, and accuracy of positioning the mobile terminal is improved.

Embodiment 4

Figure 4:
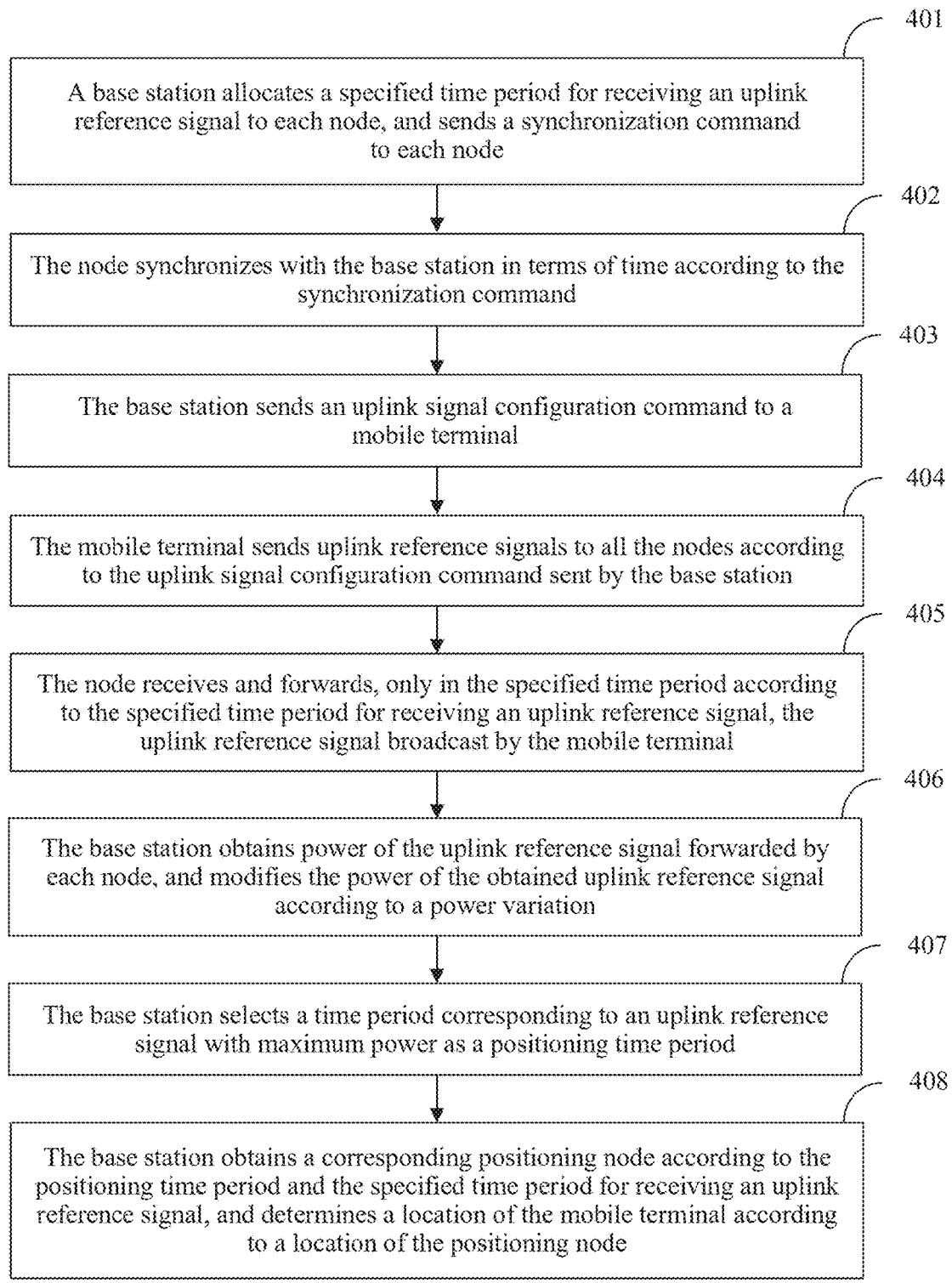
FIG. 4 is a flowchart of a mobile terminal positioning method according to an embodiment of the present invention.

FIG. 4 is a flowchart of a mobile terminal positioning method according to an embodiment of the present invention. As shown in FIG. 4, the method includes the following steps.

Step 401: A base station allocates a specified time period for receiving an uplink reference signal to each node, and sends a synchronization command to each node.

Step 402: The node synchronizes with the base station in terms of time according to the synchronization command.

Step 403: The base station sends an uplink signal configuration command to a mobile terminal.

Step 404: The mobile terminal sends uplink reference signals to all the nodes according to the uplink signal configuration command sent by the base station.

Step 405: The node receives and forwards, only in the specified time period according to the specified time period for receiving an uplink reference signal, the uplink reference signal broadcast by the mobile terminal.

Step 406: The base station obtains power of the uplink reference signal forwarded by each node, and modifies the power of the obtained uplink reference signal according to a power variation.

Step 407: The base station selects a time period corresponding to an uplink reference signal with maximum power as a positioning time period.

Step 408: The base station obtains a corresponding positioning node according to the positioning time period and the specified time period for receiving an uplink reference signal, and determines a location of the mobile terminal according to a location of the positioning node.

In this embodiment, power of a received uplink reference signal is modified, so that positioning accuracy can be improved.

Embodiment 5

Figure 5:
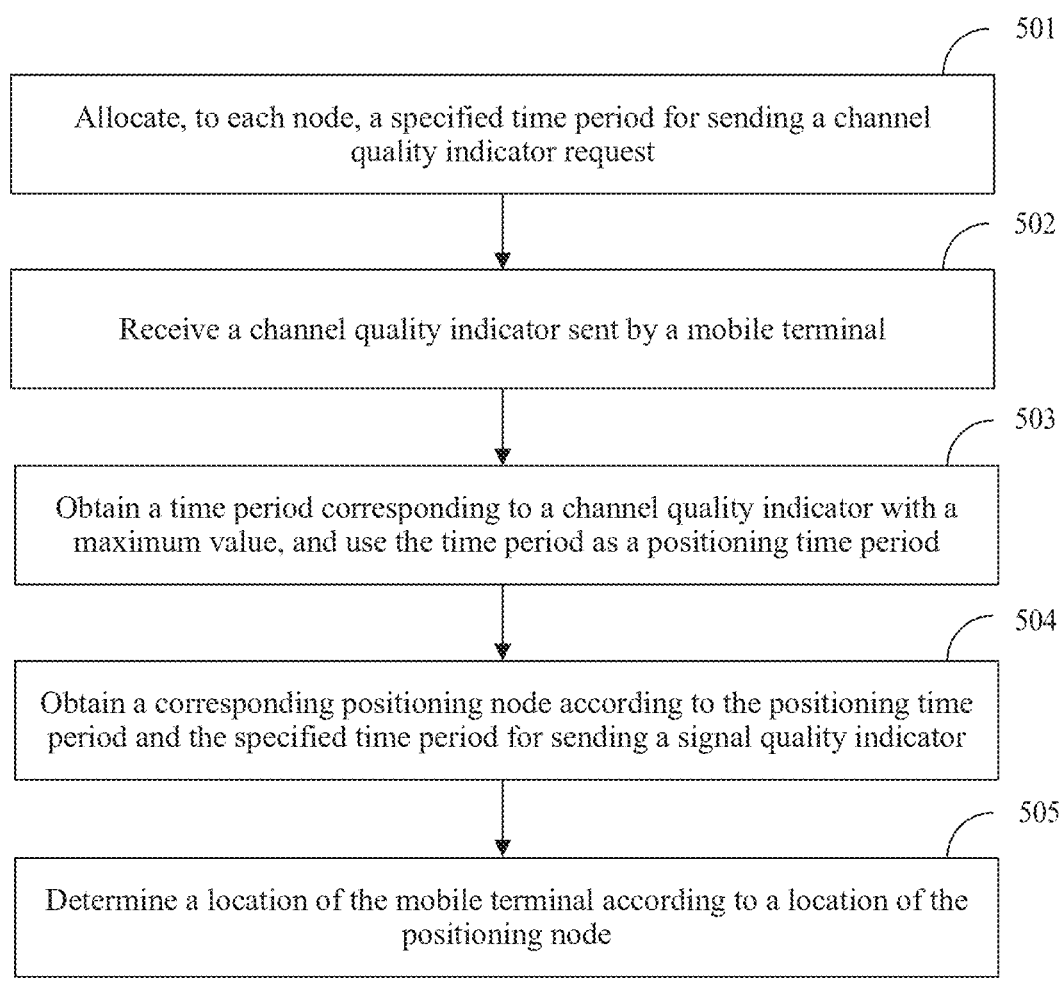
FIG. 5 is a flowchart of a mobile terminal positioning method according to an embodiment of the present invention.

FIG. 5 is a flowchart of a mobile terminal positioning method according to an embodiment of the present invention, and the method is used by a base station. In this embodiment, a mobile terminal is positioned by using downlink data.

As shown in FIG. 5, the method includes the following steps.

Step 501: Allocate, to each node, a specified time period for sending a channel quality indicator request.

Step 502: Receive a channel quality indicator sent by the mobile terminal.

The channel quality indicator is a detection result that is of quality of a channel between each node and the mobile terminal and that is detected by the mobile terminal according to a channel quality indicator request sent by each node in the specified time period.

Step 503: Obtain a time period corresponding to a channel quality indicator with a maximum value, and use the time period as a positioning time period.

Step 504: Obtain a corresponding positioning node according to the positioning time period and the specified time period for sending a signal quality indicator.

Step 505: Determine a location of the mobile terminal according to a location of the positioning node.

Because channel quality may reflect a distance, the channel quality may be used to position the mobile terminal. The base station sends a channel quality indicator request in an $N^{th}$ time period, and receives, in an $(N+4)^{th}$ time period, a channel quality indicator sent by the mobile terminal.

After step 501, the method further includes: sending, to each node, the specified time period for sending a channel quality indicator.

Before step 502, the method further includes: sending a synchronization command to each node, so that each node synchronizes with the base station in terms of time.

In this embodiment, a specified time period for sending a channel quality indicator request is allocated to each node, and a node from which each channel quality indicator comes may be learned by using a time period in which a channel quality indicator is received. Channel quality detection data with a maximum value is obtained, and a node that is closest to a mobile terminal is obtained, so that a location of the mobile terminal is obtained. Therefore, a problem that the mobile terminal cannot be positioned when cell IDs of nodes are the same is resolved and accuracy of positioning the mobile terminal is improved.

In this embodiment of the present invention, there is only one node in each time period that sends a downlink channel quality indicator request, and downlink data sending of another node is disabled. In another embodiment of the present invention, if the base station may determine that the mobile terminal is in a coverage area of only one node, there may be more than one node in each time period that sends a downlink signal. In this way, even if there is more than one node in a same time period that sends a downlink channel quality indicator request, because the mobile terminal is in the coverage area of only one node, the mobile terminal can receive a channel quality indicator request sent by only one node, and the base station can determine a node from which a received channel quality indicator comes.

Because there is more than one node in a same time period that can send a downlink signal, a network throughput can be saved.

Embodiment 6

Corresponding to the foregoing mobile terminal positioning method that is used by a base station, the present invention further provides a mobile terminal positioning method that is used by a node.

The method includes: receiving a specified time period allocated by a base station for sending a channel quality indicator request; and sending a channel quality indicator request to the mobile terminal according to the specified time period for sending a channel quality indicator request, so that the base station receives a channel quality indicator sent by the mobile terminal, obtains a time period corresponding to a channel quality indicator with a maximum value, uses the time period as a positioning time period, obtains a corresponding positioning node according to the positioning time period and the specified time period for sending a channel quality indicator request, and determines a location of the mobile terminal according to a location of the positioning node. The channel quality indicator is a detection result that is of quality of a channel between each node and the mobile terminal and that is detected by the terminal according to the channel quality indicator request.

Before the sending a channel quality indicator request to the mobile terminal according to the specified time period for sending a channel quality indicator request, the method further includes: receiving a synchronization command sent by the base station, and synchronizing with the base station in terms of time according to the synchronization command.

In the mobile terminal positioning method according to this embodiment of the present invention, a problem that a mobile terminal cannot be positioned when cell IDs of nodes are the same is resolved and accuracy of positioning the mobile terminal is improved.

Embodiment 7

Figure 6:
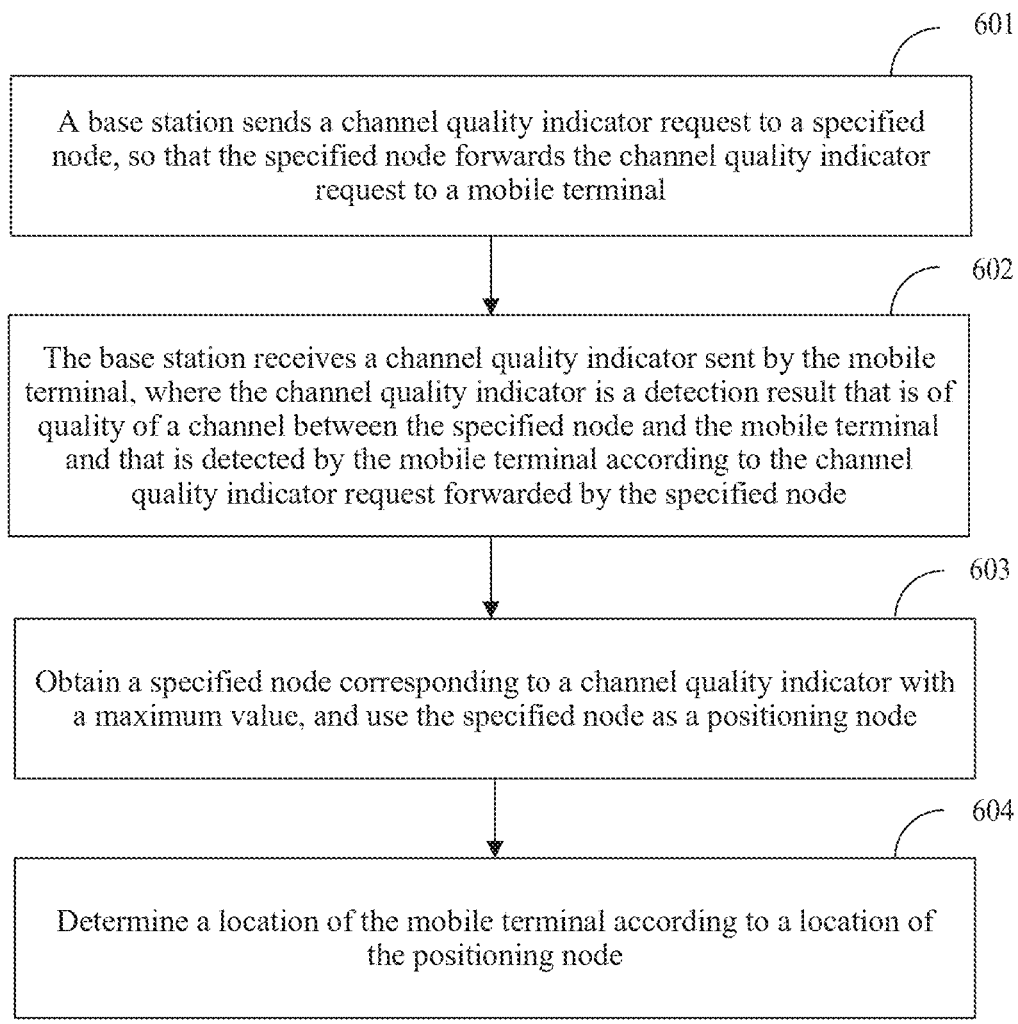
FIG. 6 is a flowchart of a mobile terminal positioning method according to an embodiment of the present invention.

FIG. 6 is a flowchart of a mobile terminal positioning method according to an embodiment of the present invention, and the method is used by a base station. In this embodiment, a mobile terminal is positioned by using downlink data.

As shown in FIG. 6, the method includes the following steps.

Step 601: The base station sends a channel quality indicator request to a specified node, so that the specified node forwards the channel quality indicator request to the mobile terminal.

Step 602: The base station receives a channel quality indicator sent by the mobile terminal, where the channel quality indicator is a detection result that is of quality of a channel between the specified node and the mobile terminal and that is detected by the mobile terminal according to the channel quality indicator request forwarded by the specified node.

Step 603: Obtain, from multiple channel quality indicators, a specified node corresponding to a channel quality indicator with a maximum value, and use the specified node as a positioning node.

Step 604: Determine a location of the mobile terminal according to a location of the positioning node.

In this embodiment, after receiving a channel quality detection indicator, the base station sends a next channel quality indicator request, and a node does not need to be consistent with the base station in terms of time. There are simple requirements for software and hardware of the node, and the mobile terminal can be positioned without a need to update the node, so that costs are reduced.

Corresponding to the foregoing mobile terminal positioning method that is used by a base station, the present invention further provides a mobile terminal positioning method that is used by a node. The method includes: receiving a channel quality indicator sent by a base station, and forwarding the channel quality indicator to the mobile terminal, so that the mobile terminal detects a detection result of quality of a channel between the specified node and the mobile terminal according to the channel quality indicator request, and sends the detection result to the base station as the channel quality indicator, and the base station obtains a node corresponding to a channel quality indicator with a maximum value, uses the node as a positioning node, and determines a location of the mobile terminal according to a location of the positioning node.

Embodiment 8

Figure 7:
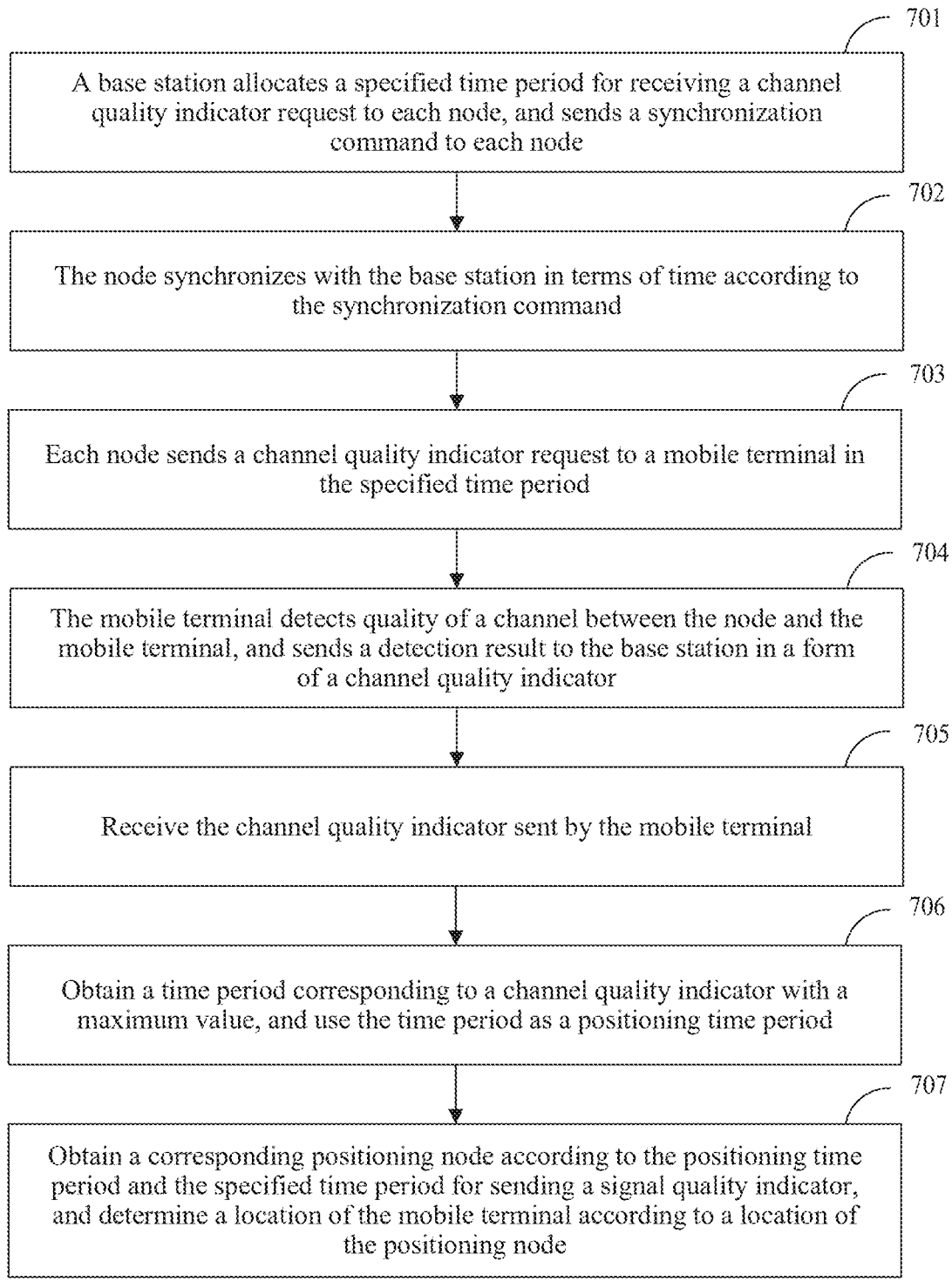
FIG. 7 is a flowchart of a mobile terminal positioning method according to an embodiment of the present invention.

FIG. 7 is a flowchart of a mobile terminal positioning method according to an embodiment of the present invention. As shown in FIG. 7, the method includes the following steps.

Step 701: A base station allocates a specified time period for receiving a channel quality indicator request to each node, and sends a synchronization command to each node.

Step 702: The node synchronizes with the base station in terms of time according to the synchronization command.

Step 703: Each node sends a channel quality indicator request to a mobile terminal in the specified time period.

Step 704: The mobile terminal detects quality of a channel between the node and the mobile terminal, and sends a detection result to the base station in a form of a channel quality indicator.

Step 705: The base station receives the channel quality indicator sent by the mobile terminal.

Step 706: Obtain a time period corresponding to a channel quality indicator with a maximum value, and use the time period as a positioning time period.

Step 707: Obtain a corresponding positioning node according to the positioning time period and the specified time period for sending a signal quality indicator, and determine a location of the mobile terminal according to a location of the positioning node.

In this embodiment, a specified time period for sending a channel quality indicator request is allocated to each node, and a node from which each channel quality indicator comes may be learned by using a time period in which a channel quality indicator is received. A node that is closest to a mobile terminal is obtained by obtaining a channel quality indicator with a maximum value, so that a location of the mobile terminal is obtained. Therefore, a problem that the mobile terminal cannot be positioned when cell IDs of nodes are the same is resolved and accuracy of positioning the mobile terminal is improved.

Embodiment 9

Figure 8:
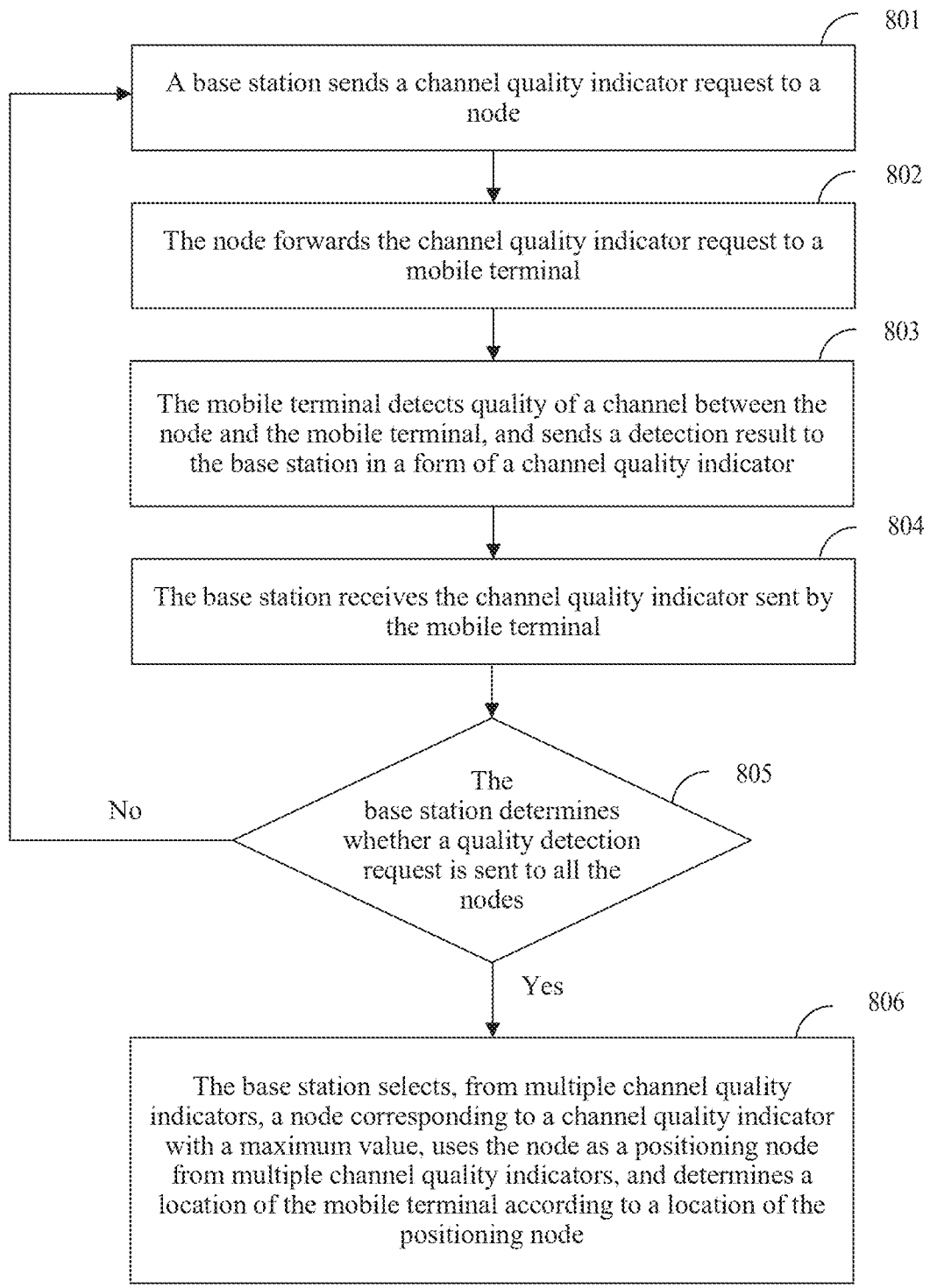
FIG. 8 is a flowchart of a mobile terminal positioning method according to an embodiment of the present invention.

FIG. 8 is a flowchart of a mobile terminal positioning method according to an embodiment of the present invention. As shown in FIG. 8, the method includes the following steps.

Step 801: A base station sends a channel quality indicator request to a node.

Step 802: The node forwards the channel quality indicator request to a mobile terminal.

Step 803: The mobile terminal detects quality of a channel between the node and the mobile terminal, and sends a detection result to the base station in a form of a channel quality indicator.

Step 804: The base station receives the channel quality indicator sent by the mobile terminal.

Step 805: The base station determines whether a quality detection request is sent to all the nodes; and if the quality detection request is not sent to all the nodes, go to step 801; or if the quality detection request is sent to all the nodes, go to step 806.

Step 806: The base station selects, from multiple channel quality indicators, a node corresponding to a channel quality indicator with a maximum value, uses the node as a positioning node, and determines a location of the mobile terminal according to a location of the positioning node.

In this embodiment, a base station needs to determine whether a quality detection request is sent to all nodes. Actually, if the base station can learn a rough range of the mobile terminal in advance or determine a rough range of the mobile terminal according to the received channel quality indicator, the base station only needs to determine whether the quality detection request is sent to some nodes. For example, the base station groups the nodes into four areas according to geographical locations, and the four areas are denoted as an area A, an area B, an area C, and an area D. If the base station has received channel quality indicators between multiple nodes in the area A and the area B and a mobile terminal that needs to be positioned, and between some nodes in the area C and the area D and a mobile terminal that needs to be positioned, and learns that the node is in the area A or the area B by means of analysis, the base station does not need to send the quality detection request to other nodes in the area C and the area D.

In this embodiment, after receiving a channel quality detection indicator, a base station sends a next channel quality indicator request, and a node does not need to be consistent with the base station in terms of time. There are simple requirements for software and hardware of the node, and a mobile terminal can be positioned without a need to update the node, so that costs are reduced.

Embodiment 10

Figure 9:
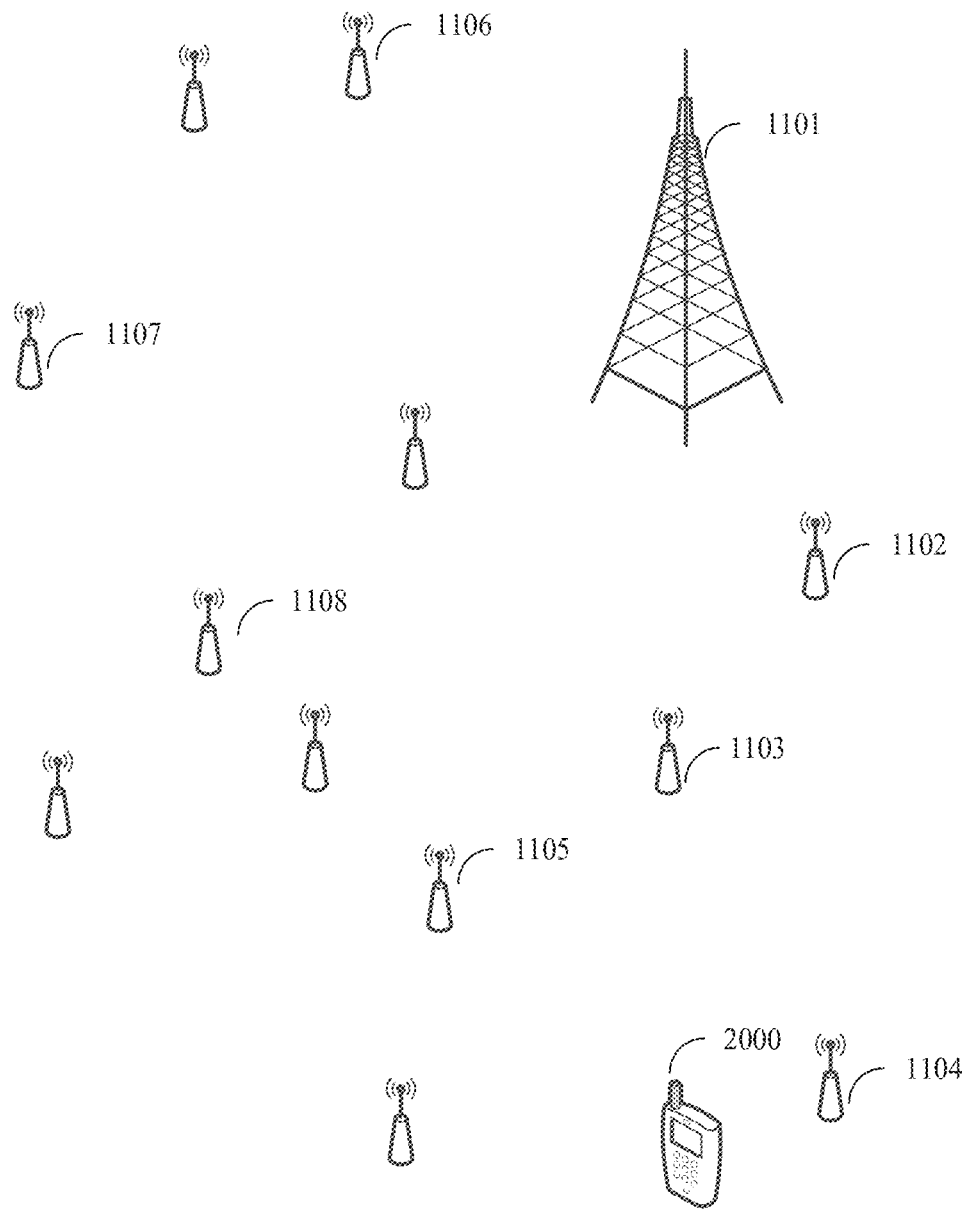
FIG. 9 is a schematic diagram of an application scenario according to an embodiment of the present invention.
Figure 10:
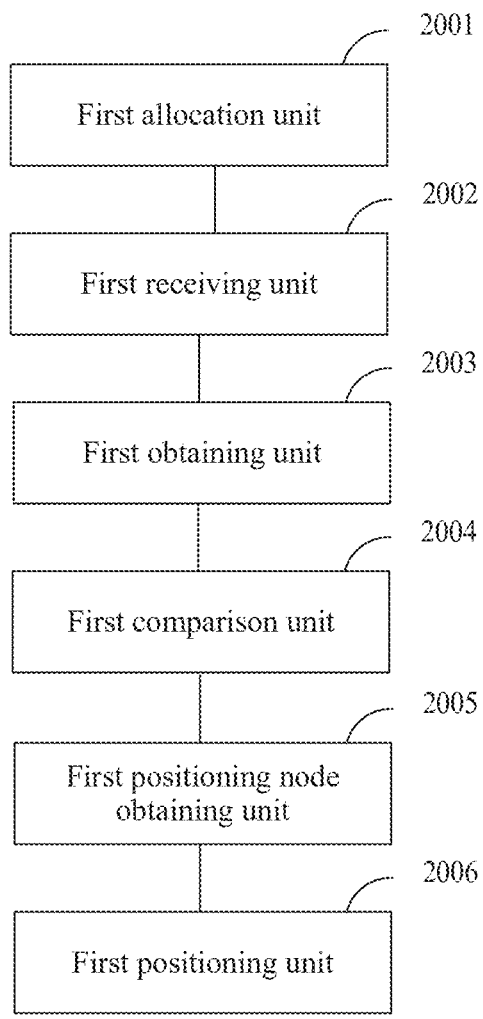
FIG. 10 is a schematic structural diagram of a base station according to an embodiment of the present invention.

FIG. 9 is a schematic diagram of an application scenario according to an embodiment of the present invention. As shown in FIG. 9, a base station 1101, multiple nodes 1102, 1103, 1104, and the like are arranged in an area, cell IDs of the multiple nodes are the same, and a mobile terminal that needs to be positioned is a mobile terminal 2000.

The base station receives an uplink reference signal forwarded by each node, selects a time period corresponding to an uplink reference signal with maximum power or a maximum signal-to-noise ratio as a positioning time period, obtains a positioning node according to the uplink reference signal receiving rule, and determines a location of the mobile terminal according to a location of the positioning node. The positioning node is a node corresponding to the positioning time period. In FIG. 9, the node corresponding to the uplink reference signal with the maximum power is the node 1104, and a location of the node 1104 is used as a location of the mobile terminal 2000.

Embodiment 11

Corresponding to the foregoing positioning method, the present invention further provides a base station. The base station includes: a first allocation unit 2001, configured to allocate a specified time period for receiving an uplink reference signal to each node. The base station also includes a first receiving unit 2002, configured to receive an uplink reference signal that is received in the specified time period and forwarded by each node, and a first obtaining unit 2003, configured to obtain power or a signal-to-noise ratio of the uplink reference signal forwarded by each node. The base station also includes a first comparison unit 2004, configured to select a time period corresponding to an uplink reference signal with maximum power or a maximum signal-to-noise ratio as a positioning time period. The base station also includes a first positioning node obtaining unit 2005, configured to obtain a corresponding positioning node according to the positioning time period and the specified time period for receiving an uplink reference signal. The base station also includes a first positioning unit 2006, configured to determine a location of the mobile terminal according to a location of the positioning node.

The base station further includes: a first sending unit, configured to send the specified time period for receiving an uplink reference signal to each node.

The base station further includes: a first synchronization command sending unit, configured to send a synchronization command to each node, so that each node synchronizes with the base station in terms of time.

The base station further includes: a configuration command sending unit, configured to send an uplink signal configuration command to the mobile terminal, so that the mobile terminal sends the uplink reference signal to the node according to the uplink signal configuration command.

The base station further includes: a power control rule sending unit, configured to send a power control rule to the mobile terminal, so that the mobile terminal sends uplink reference signals at consistent power.

The base station further includes: a modification unit, configured to modify, before the first obtaining unit selects the time period corresponding to the uplink reference signal with the maximum power or the maximum signal-to-noise ratio as the positioning time period, the power of the obtained uplink reference signal according to a power variation of the uplink reference signal sent by the mobile terminal.

This embodiment of the present invention further provides a node. The node includes a second receiving unit, configured to receive a specified time period allocated by a base station for receiving an uplink reference signal. The node also includes a second sending unit, configured to receive, according to the specified time period, an uplink reference signal sent by a mobile terminal. The node also includes a forwarding unit, configured to forward the uplink reference signal to the base station, so that the base station obtains power of the uplink reference signal or a signal-to-noise ratio of the uplink reference signal, selects a time period corresponding to an uplink reference signal with maximum power or a maximum signal-to-noise ratio as a positioning time period, obtains a corresponding positioning node according to the positioning time period and the specified time period for receiving an uplink reference signal, and determines a location of the mobile terminal according to a location of the positioning node.

The node further includes: a first synchronization unit, configured to: receive a synchronization command sent by the base station, and synchronize with the base station in terms of time according to the synchronization command.

This embodiment of the present invention provides a base station and a node. A specified time period for receiving an uplink reference signal is allocated to each node, and an uplink reference signal that is received in the specified time period and forwarded by each node is received, so that a node from which each uplink reference signal comes or a node from which each channel quality indicator comes may be learned. Therefore, a problem that a mobile terminal cannot be positioned when cell IDs of nodes are the same is resolved, and accuracy of positioning the mobile terminal is improved.

This embodiment of the present invention further provides a base station, and the base station includes: a second allocation unit, configured to allocate, to each node, a specified time period for sending a channel quality indicator request. The base station also includes a third receiving unit, configured to receive a channel quality indicator sent by the mobile terminal, where the channel quality indicator is a detection result that is of quality of a channel between each node and the mobile terminal and that is detected by the mobile terminal according to a channel quality indicator request sent by each node in the specified time period. The base station also includes a second comparison unit, configured to: obtain a time period corresponding to a channel quality indicator with a maximum value, and use the time period as a positioning time period. The base station also includes a second positioning node obtaining unit, configured to obtain a corresponding positioning node according to the positioning time period and the specified time period for sending a signal quality indicator. The base station also includes a second positioning unit, configured to determine a location of the mobile terminal according to a location of the positioning node.

The base station further includes: a third sending unit, configured to send, to each node, the specified time period for sending a channel quality indicator.

The base station further includes: a second synchronization command sending unit, configured to send a synchronization command to each node, so that each node synchronizes with the base station in terms of time.

This embodiment of the present invention further provides a node. The node includes: a fourth receiving unit, configured to receive a specified time period allocated by a base station for sending a channel quality indicator request; and a channel quality request sending unit, configured to send a channel quality indicator request to the mobile terminal according to the specified time period, so that the base station receives a channel quality indicator sent by the mobile terminal, obtains a time period corresponding to a channel quality indicator with a maximum value, uses the time period as a positioning time period, obtains a corresponding positioning node according to the positioning time period and the specified time period for sending a channel quality indicator request, and determines a location of the mobile terminal according to a location of the positioning node. The channel quality indicator is a detection result that is of quality of a channel between each node and the mobile terminal and that is detected by the terminal according to the channel quality indicator request.

The node further includes: a second synchronization unit, configured to: receive a synchronization command sent by the base station, and synchronize with the base station in terms of time according to the synchronization command.

This embodiment of the present invention provides a base station and a node. A specified time period for sending a channel quality indicator request is allocated to each node, and a node from which each channel quality indicator comes may be learned by using a time period in which a channel quality indicator is received. Channel quality detection data with a maximum value is obtained, and a node that is closest to a mobile terminal is obtained, so that a location of the mobile terminal is obtained. Therefore, a problem that the mobile terminal cannot be positioned when cell IDs of nodes are the same is resolved, and accuracy of positioning the mobile terminal is improved.

This embodiment of the present invention further provides a base station, and the base station includes: a fourth sending unit, configured to send a channel quality indicator request to a specified node, so that the specified node forwards the channel quality indicator request to the mobile terminal; a channel quality indicator receiving unit, configured to receive a channel quality indicator sent by the mobile terminal, where the channel quality indicator is a detection result that is of quality of a channel between the specified node and the mobile terminal and that is detected by the mobile terminal according to the channel quality indicator request forwarded by the specified node; a third positioning node obtaining unit, configured to: obtain a specified node corresponding to a channel quality indicator with a maximum value, and use the specified node as a positioning node; and a third positioning unit, configured to determine a location of the mobile terminal according to a location of the positioning node.

This embodiment of the present invention further provides a node, and the node includes: a receiving and forwarding unit, configured to: receive a channel quality indicator sent by a base station, and forward the channel quality indicator to the mobile terminal, so that the mobile terminal detects a detection result of quality of a channel between the specified node and the mobile terminal according to the channel quality indicator request, and sends the detection result to the base station as the channel quality indicator, and the base station obtains a node corresponding to a channel quality indicator with a maximum value, uses the node as a positioning node, and determines a location of the mobile terminal according to a location of the positioning node.

In this embodiment, after receiving a channel quality detection indicator, a base station sends a next channel quality indicator request, and a node does not need to be consistent with the base station in terms of time. There are simple requirements for software and hardware of the node, and a mobile terminal can be positioned without a need to update the node, so that costs are reduced.

The embodiments of the present invention provide a mobile terminal positioning method, a base station, and a node. A specified time period for receiving an uplink reference signal is allocated to each node, and an uplink reference signal that is received in the specified time period and forwarded by each node is received, so that a node from which each uplink reference signal comes or a node from which each channel quality indicator comes may be learned. Therefore, a problem that a mobile terminal cannot be positioned when cell IDs of nodes are the same is resolved, and accuracy of positioning the mobile terminal is improved. The embodiments of the present invention further disclose a mobile terminal positioning method, a base station, and a node. A specified time period for sending a channel quality indicator request is allocated to each node, and a node from which each channel quality indicator comes may be learned by using a time period in which a channel quality indicator is received. Channel quality detection data with a maximum value is obtained, and a node that is closest to a mobile terminal is obtained, so that a location of the mobile terminal is obtained. Therefore, a problem that the mobile terminal cannot be positioned when cell IDs of nodes are the same is resolved, and accuracy of positioning the mobile terminal is improved.

A system embodiment basically corresponds to a method embodiment. Therefore, for related parts, reference may be made to parts in the method embodiment. The described system embodiment is merely an example. The units described as separate parts may or may not be physically separate, and parts displayed as units may or may not be physical units, may be located in one position, or may be distributed on a plurality of network units. Some or all of the modules may be selected according to actual needs to achieve the objectives of the solutions of the embodiments. A person of ordinary skill in the art may understand and implement the embodiments of the present invention without creative efforts.

The present invention may be described in general context of computer executable instructions executed by a computer, for example, a program module. Generally, the program module includes a routine, a program, an object, a component, a data structure, and the like for executing a particular task or implementing a particular abstract data type. Alternatively, the present invention may be practiced in a distributed computing environment in which tasks are performed by remote processing devices that are connected by using a communications network. In the distributed computing environment, program modules may be located in local and remote computer storage media including storage devices.

A person of ordinary skill in the art may understand that all or a part of the steps of the method embodiments may be implemented by program instructing relevant hardware. The program may be stored in a computer readable storage medium, and the storage medium is a ROM, a RAM, a magnetic disk, an optical disc, or the like.

It should be noted that in this specification, relational terms such as first and second are only used to distinguish one entity or operation from another, and do not necessarily require or imply that any actual relationship or sequence exists between these entities or operations. Moreover, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element preceded by "includes a . . . " does not, without more constraints, preclude the existence of additional identical elements in the process, method, article, or apparatus that includes the element.

In short, the foregoing descriptions are merely examples of embodiments of the present invention, but are not intended to limit the protection scope of the present invention. Specific examples are used in this specification to describe the principle and implementation manners of the present invention. The descriptions of the foregoing embodiments are merely intended to help understand the method and core idea of the present invention. In addition, a person skilled in the art may make modifications with respect to the specific implementation manners and the application scope according to the idea of the present invention. Therefore, the content of this specification shall not be construed as a limitation on the present invention. Therefore, the content of this specification shall not be construed as a limitation on the present invention. Any modification, equivalent replacement, or improvement made without departing from the spirit and principle of the present invention shall fall within the protection scope of the present invention.

What is claimed is:

1. A method, executed by a base station, the method comprising:
    allocating, for each node of one or more nodes, a respective specified time period for receiving an uplink reference signal at the respective node;
    receiving, by the base station from each node of the one or more nodes, a respective uplink reference signal received by the respective node of the one or more nodes, wherein each node of the one or more nodes receives the uplink reference signal in the respective specified time period and forwards the respective uplink reference signal;
    for each respective received uplink reference signal, obtaining power or a signal-to-noise ratio of the respective uplink reference signal;
    selecting a time period corresponding to a first respective uplink reference signal with a maximum power or a maximum signal-to-noise ratio as a positioning time period;
    selecting a corresponding positioning node according to the positioning time period and a respective specified time period allocated for receiving the first respective uplink reference signal; and
    determining a location of a mobile terminal according to a location of the positioning node.

2. The method according to claim 1, wherein after allocating, for each node of the one or more nodes, the respective specified time period for receiving the uplink reference signal, the method further comprises:
    sending, to each node of the one or more nodes, the respective allocated specified time period for receiving the uplink reference signal.

3. The method according to claim 1, wherein before receiving, by the base station from each node of the one or more nodes, the respective uplink reference signal received by the respective node, the method further comprises:
    sending a synchronization command to each node of the one or mode nodes, so that each node of the one or mode nodes synchronizes with a base station in terms of time.

4. The method according to claim 1, wherein before receiving, by the base station from each node of the one or more nodes, the respective uplink reference signal received by the respective node, the method further comprises:
    sending an uplink signal configuration command to the mobile terminal, so that the mobile terminal sends the uplink reference signal to each node of the one or more nodes according to the uplink signal configuration command.

5. The method according to claim 1, wherein before receiving, by the base station from each node of the one or more nodes, the respective uplink reference signal received by the respective node, the method further comprises:
sending a power control rule to the mobile terminal, so that the mobile terminal sends a plurality of uplink reference signals at consistent power.

6. The method according to claim 1, wherein, before selecting the time period corresponding to the first respective uplink reference signal with the maximum power or the maximum signal-to-noise ratio as the positioning time period, the method further comprises:
modifying a power of a second respective uplink reference signal according to a power variation of the uplink reference signal sent by the mobile terminal.

7. A method, comprising:
receiving, by a first node, a specified time period allocated by a base station for receiving an uplink reference signal;
receiving, by the first node according to the specified time period for receiving the uplink reference signal, the uplink reference signal sent by a mobile terminal; and
forwarding, by the first node, the uplink reference signal to the base station, wherein the base station receives the uplink reference signal from each of one or more nodes including the first node, the base station obtains power of each received uplink reference signal or a signal-to-noise ratio of each received uplink reference signal, the base station selects a time period corresponding to a received first uplink reference signal with maximum power or a maximum signal-to-noise ratio as a positioning time period, selects a corresponding positioning node according to the positioning time period and the specified time period for receiving the first uplink reference signal with the maximum power or the maximum signal-to-noise ratio, and determines a location of the mobile terminal according to a location of the positioning node.

8. The method according to claim 7, wherein before receiving, according to the specified time period, the uplink reference signal sent by the mobile terminal, the method further comprises:
receiving a synchronization command sent by the base station, and synchronizing with the base station in terms of time according to the synchronization command.

9. A method, comprising:
for each node of one or more nodes, allocating, by a base station to the respective node, a respective specified time period for sending a channel quality indicator request;
receiving, by the base station, one or more channel quality indicators sent by a mobile terminal, wherein each received channel quality indicator is a detection result that is of quality of a channel between a respective node of the one or more nodes and the mobile terminal, and each received channel quality indicator is detected by the mobile terminal according to a respective channel quality indicator request sent by a respective node in the respective allocated specified time period;
obtaining a time period corresponding to a first channel quality indicator of the one or more channel quality indicators with a maximum value, and using the time period as a positioning time period;
obtaining a corresponding positioning node according to the positioning time period and the specified time period allocated for sending a first signal quality indicator request corresponding to the first channel quality indicator; and
determining a location of the mobile terminal according to a location of the positioning node.

10. The method according to claim 9, wherein after allocating, to each node, the respective specified time period for sending the channel quality indicator request, the method further comprises:
sending, to each node, the respective specified time period for sending the respective channel quality indicator request.

11. The method according to claim 9, wherein, before receiving the one or more channel quality indicators sent by the mobile terminal, the method further comprises:
sending a synchronization command to each node of the one or more nodes, so that each node synchronizes with the base station in terms of time.

12. A base station, comprising:
a processor; and
a non-transitory computer-readable storage medium storing a program to be executed by the processor, the program including instructions for:
allocating, for each node of one or more nodes, a respective specified time period for receiving an uplink reference signal at the respective node of the one or more nodes;
receiving, at the base station from each node of the one or more nodes, a respective uplink reference signal received by the respective node of the one or more nodes, wherein each node of the one or more nodes receives the uplink reference signal in the respective specified time period and forwards the uplink reference signal;
for each received respective uplink reference signal, obtaining power or a signal-to-noise ratio of the respective uplink reference signal;
selecting a time period corresponding to a first respective uplink reference signal with a maximum power or a maximum signal-to-noise ratio as a positioning time period;
selecting a corresponding positioning node according to the positioning time period and a respective specified time period allocated for receiving the first respective uplink reference signal; and
determining a location of a mobile terminal according to a location of the positioning node.

13. The base station according to claim 12, further comprising:
a transmitter, configured to send, to each node of the one or more nodes, the respective allocated specified time period for receiving the uplink reference signal.

14. The base station according to claim 12, further comprising:
a transmitter, configured to send a synchronization command to each node of the one or mode nodes, so that each node of the one or mode nodes synchronizes with the base station in terms of time.

15. The base station according to claim 12, further comprising:
a transmitter, configured to send an uplink signal configuration command to the mobile terminal, so that the mobile terminal sends the uplink reference signal to each node of the one or more nodes according to the uplink signal configuration command.

16. The base station according to claim 12, further comprising:
a transmitter, configured to send a power control rule to the mobile terminal, so that the mobile terminal sends a plurality of uplink reference signals at consistent power.

17. The base station according to of claim 12, wherein the program further includes instructions for:
modifying, before selecting the time period corresponding to the first respective uplink reference signal with the maximum power or the maximum signal-to-noise ratio as the positioning time period, a power of a second respective uplink reference signal according to a power variation of the uplink reference signal sent by the mobile terminal.

18. A first node, comprising:
a receiver, configured to:
receive a specified time period allocated by a base station for receiving an uplink reference signal; and
receive, according to the specified time period, the uplink reference signal sent by a mobile terminal; and
a transmitter, configured to forward the uplink reference signal to the base station, wherein the base station receives the uplink reference signal from each of one or more nodes including the first node, the base station obtains power of each received uplink reference signal or a signal-to-noise ratio of each received uplink reference signal, the base station, the base station selects a time period corresponding to a first received uplink reference signal with maximum power or a maximum signal-to-noise ratio as a positioning time period, selects a corresponding positioning node according to the positioning time period and the specified time period for receiving the first uplink reference signal with the maximum power or the maximum signal-to-noise ratio, and determines a location of the mobile terminal according to a location of the positioning node.

19. The first node according to claim 18, further comprising:
a processor; and
a non-transitory computer-readable storage medium storing a program to be executed by the processor, the program including instructions for:
receiving a synchronization command sent by the base station, and synchronizing with the base station in terms of time according to the synchronization command.

20. A base station, comprising:
a processor; and
a non-transitory computer-readable storage medium storing a program to be executed by the processor, the program including instructions for:
for each node of one or more nodes, allocating to the respective node a respective specified time period for sending a channel quality indicator request;
receiving one or more channel quality indicators sent by a mobile terminal, wherein each received channel quality indicator is a detection result that is of quality of a channel between a respective node of the one or more nodes and the mobile terminal, and each received channel quality indicator is detected by the mobile terminal according to a respective channel quality indicator request sent by a respective node in the respective allocated specified time period;
obtaining a time period corresponding to a first channel quality indicator of the one or more channel quality indicators with a maximum value, and using the time period as a positioning time period;
obtaining a corresponding positioning node according to the positioning time period and the specified time period allocated for sending a first signal quality indicator request corresponding to the first channel quality indicator; and
determining a location of the mobile terminal according to a location of the positioning node.

21. The base station according to claim 20, further comprising:
a transmitter, configured to send, to each node of the one or more nodes, the respective specified time period for sending the respective channel quality indicator request.

22. The base station according to claim 20, further comprising:
a transmitter, configured to send a synchronization command to each node of the one or more nodes, so that each node synchronizes with the base station in terms of time.

* * * * *